(No Model.)
W. OLIPHANT.
APPARATUS FOR PROMOTING COMBUSTION.
No. 341,680. Patented May 11, 1886.
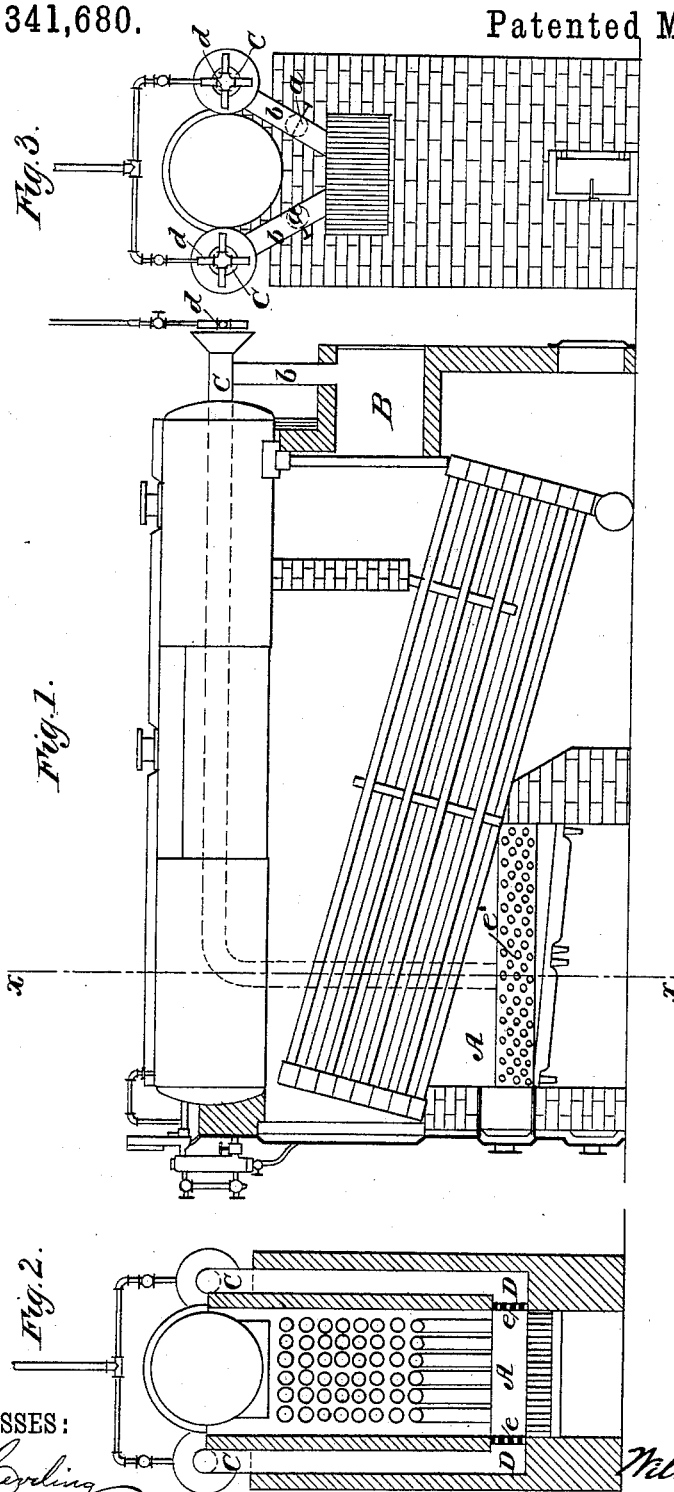
WITNESSES:
INVENTOR
William Oliphant
BY
Chas. N. Forbes
ATTORNEY

UNITED STATES PATENT OFFICE.

WILLIAM OLIPHANT, OF JERSEY CITY, NEW JERSEY.

APPARATUS FOR PROMOTING COMBUSTION.

SPECIFICATION forming part of Letters Patent No. 341,680, dated May 11, 1886.

Application filed February 11, 1886. Serial No. 191,567. (No model.)

*To all whom it may concern:*

Be it known that I, WILLIAM OLIPHANT, a citizen of the United States, residing at Jersey City, in the county of Hudson and State of New Jersey, have invented a new and useful Improvement in Apparatus for Promoting the Combustion of Fuel, of which the following is a specification, reference being had to the accompanying drawings, forming a part of the same, in which—

Figure 1 is a side view; Fig. 2, a vertical cross-section on the line $x\ x$, Fig. 1; and Fig. 3, a rear end elevation of a generator with my invention attached.

The object of my invention is to admit a body of air into or above the incandescent fuel in the furnace, to inflame the unconsumed combustible matter which ordinarily passes away from the fire; and the invention consists in the attachment of a conductory leading from the atmosphere to one or more improvised flue-spaces located adjacent to the furnace and communicating therewith through a perforated partition, and in providing said conductory with branch pipes connecting the same with the chimney or intermediate connections, said branch pipes being fitted with dampers for closing the same or regulating the admission of the heated gases, and in applying a steam-jet to the atmospheric inlet of the conductory to assist its natural draft.

In the accompanying drawings I have illustrated my invention connected with a sectional steam-generator, although it is equally applicable to other types of generators, and also to furnaces adapted to other purposes.

Referring to the drawings, A is the furnace; B, the smoke connection adjacent to the chimney; C, the air conducting tubes; D, the flue-spaces adjacent to the furnace, with which the air-conducting tubes C communicate; $a\ a$, dampers located in the branch pipes $b\ b$, leading from the smoke-connection B to the conducting-tubes C; $d$, a steam-jet arranged, as shown, at the flaring mouth of the conducting-tubes C, and $e$ are perforated partitions between the furnace A and the flue-spaces D.

In operation atmospheric air enters the conducting-tubes C, through which it is directed to the flue-spaces D, and through the perforated partitions $e$ to the furnace A. The entering air is preferably distributed above the fuel, so as to combine with the rising combustible gases, and thereby supply such an additional amount of oxygen as to produce a more perfect combustion.

The branch pipes $b$ are designed to admit such a portion of the heated escaping gases that will elevate the temperature of the entering air and increase the natural draft of the air-tubes, the volume of such admitted heated gases being regulated by the adjustment of the dampers $a$, located in said branch pipes $b$, as shown in Fig. 3.

The steam-jet $d$, applied as shown in Figs. 1 and 3, at the mouth of the air-conducting tubes, is composed of crossed branch pipes closed at their outer ends and perforated to direct the jets of steam issuing therefrom into the mouth of the air-conducting tubes C, which also assists their natural draft, the steam being drawn from any convenient part of the steam-space of the generator and regulated by an intermediate stop-cock.

Having thus fully described my invention, what I claim, and desire to secure by Letters Patent, is—

In an apparatus for conducting atmospheric air to the furnace of a steam-generator or other fuel-chamber, the combination, with one or more pipes open to the atmosphere at one end, and forming a communication with one or more flue-spaces located adjacent to the furnace and separated therefrom by a perforated partition, of a branch pipe or pipes leading from the chimney, provided with dampers to regulate the admission of the heated gases, and a steam jet located at the mouth of the air-conducting pipes, substantially as described.

WILLIAM OLIPHANT.

Witnesses:
 CHAS. W. FORBES,
 HY. WELSH.